United States Patent [19]

Sandell et al.

[11] Patent Number: 5,560,101
[45] Date of Patent: Oct. 1, 1996

[54] METHOD OF INSTALLING AN ELECTRICAL DEVICE ON AN ELECTRICAL JUNCTION BOX

[75] Inventors: Donald R. Sandell, San Jose; Wade P. Lee, Lafayette, both of Calif.

[73] Assignee: Larry C. Y. Lee, Hayward, Calif.

[21] Appl. No.: 468,555

[22] Filed: Jun. 6, 1995

Related U.S. Application Data

[62] Division of Ser. No. 80,659, Jun. 18, 1993, Pat. No. 5,442,132.

[51] Int. Cl.$^6$ ..................................................... H01R 43/00
[52] U.S. Cl. ................................ 29/868; 174/48; 248/343
[58] Field of Search ............................. 29/868, 869, 870, 29/758, 33 F; 248/343; 174/48

[56] References Cited

U.S. PATENT DOCUMENTS

| | | | |
|---|---|---|---|
| 2,532,528 | 12/1950 | Zuley | 248/343 X |
| 2,545,124 | 3/1951 | Tornblum | 248/343 |
| 2,569,859 | 10/1951 | Locke | 248/343 X |
| 2,675,696 | 4/1954 | Bisson | 248/343 X |
| 4,162,779 | 7/1979 | Steenhoven et al. | 248/343 |

*Primary Examiner*—Carl J. Arbes
*Attorney, Agent, or Firm*—Elliot B. Aronson

[57] ABSTRACT

A simple, low-cost method and apparatus for supporting a lighting fixture, motion detector or the like while it is being electrically connected and mounted on a junction box in a side wall or ceiling. A disposable support link is provided for supporting the weight of the fixture during installation. The support link is easily attachable to the junction box and to the fixture without the need for tools, and can even be attached with only one hand. When the electrical connections are completed and the fixture is ready to be mounted on the junction box, the support link may simply be left in place in the junction box or in one embodiment may be removed with one hand as easily as it was attached. The support link is secured to the back side of the fixture in a position that will face the junction box when the fixture is in its installed configuration on the junction box. The other end of the support link is formed to be attachable to the junction box, either directly or through additional mounting hardware such as a cross bar across the face of the junction box. The junction box or cross bar is an otherwise conventional junction box or cross bar that has been provided with a means by which the support link may be readily attached at the time of installation with a simple hand motion without any tools. With this apparatus an installer begins installing a fixture first by attaching the support link so that the fixture hangs from the junction box firmly supported by the support link. The installer then has both hands free to make the electrical connections. The support link may then be removed or, since it is flexible and occupies almost no space, may be stuffed into the junction box along with the electrical leads from the fixture as the fixture is mounted on the junction box.

4 Claims, 2 Drawing Sheets

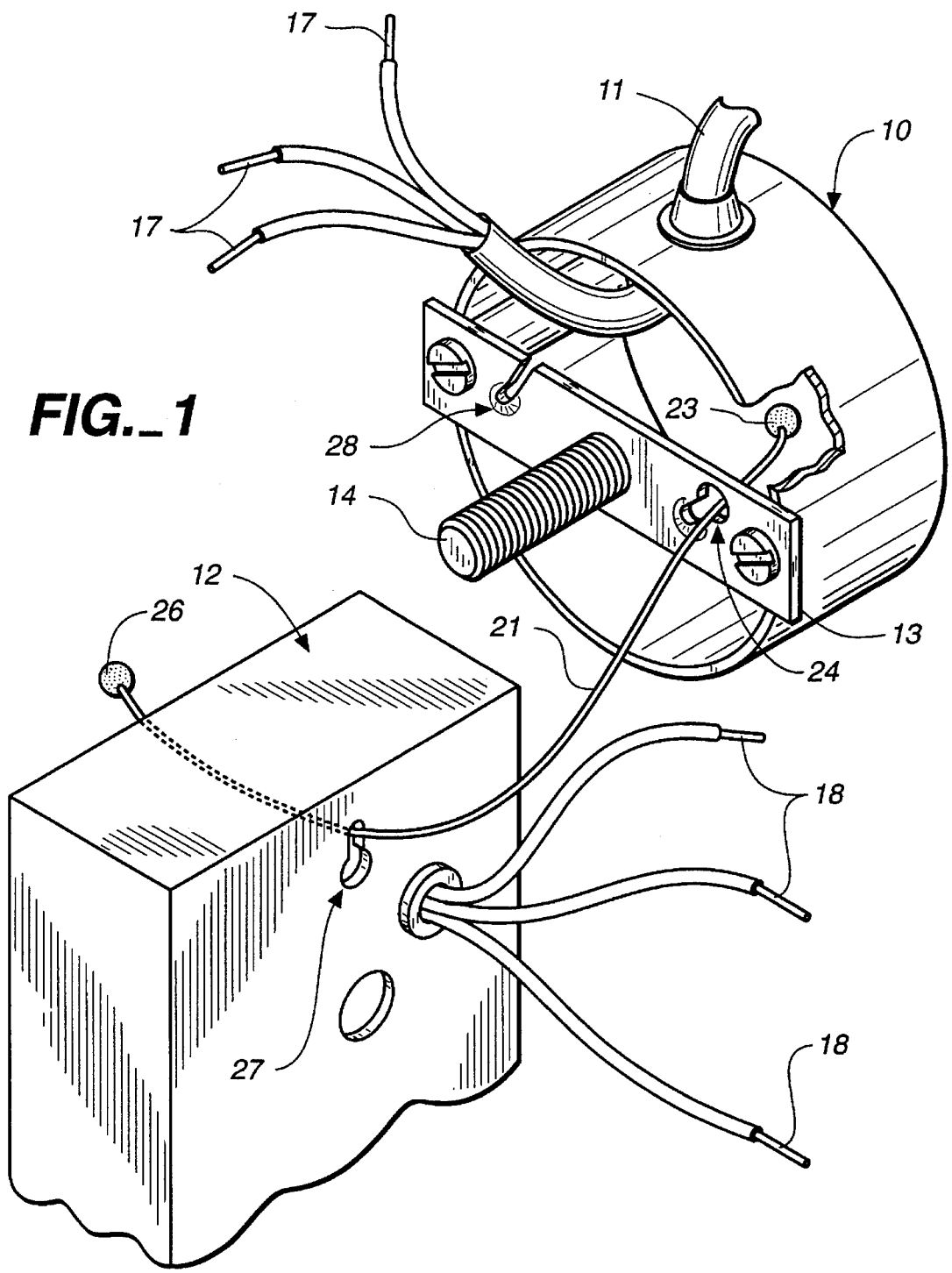
FIG._1
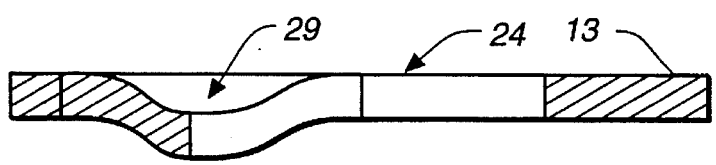
FIG._2

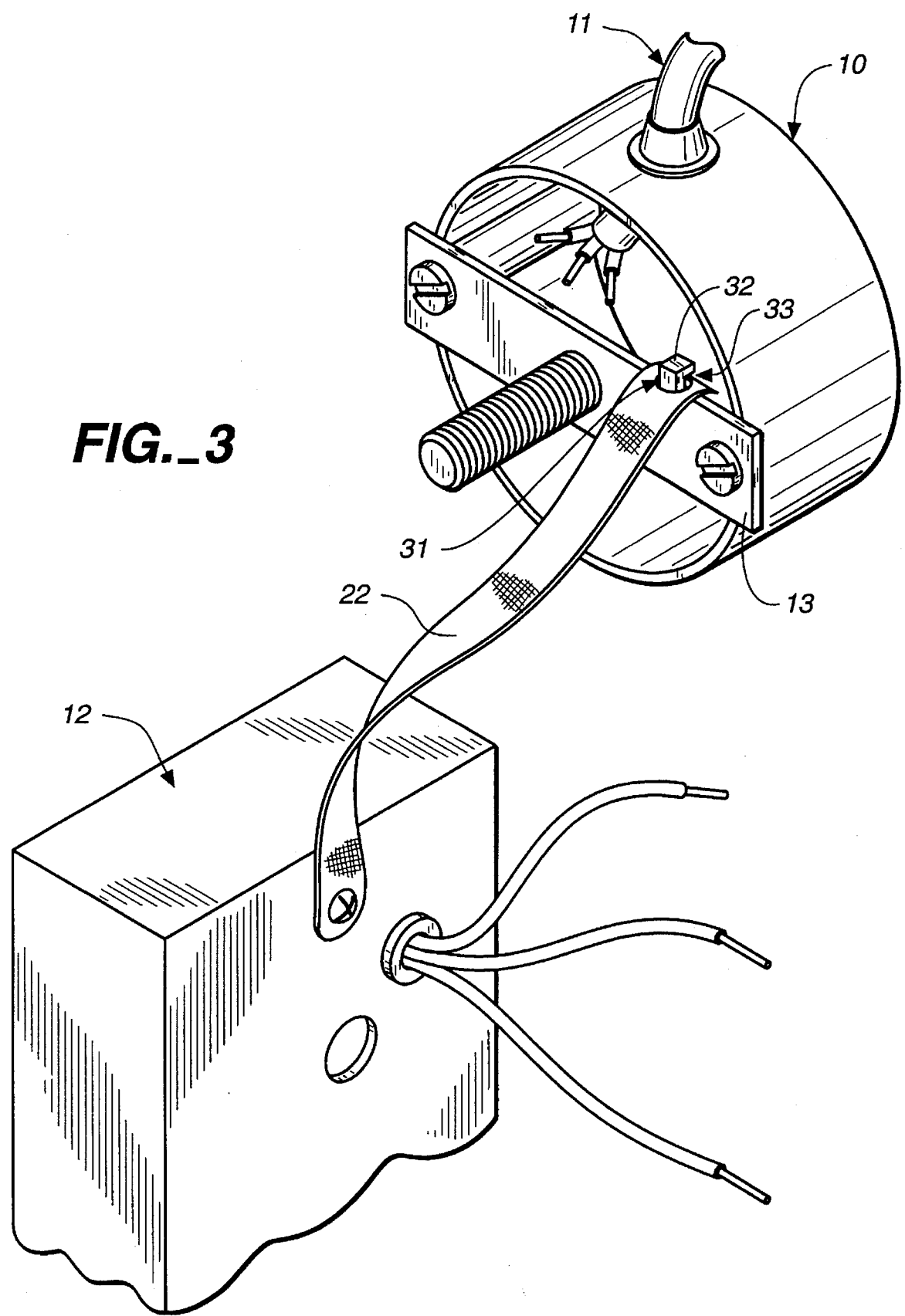
FIG._3

METHOD OF INSTALLING AN ELECTRICAL DEVICE ON AN ELECTRICAL JUNCTION BOX

This is a division of application Ser. No. 08/080,659 filed Jun. 18, 1993, now U.S. Pat. No. 5,442,132.

BACKGROUND OF THE INVENTION

The present invention relates to apparatus for installing a motion detector, lighting fixture or the like on a wall or ceiling.

An electrical fixture such as a lighting fixture is normally secured to a wall or ceiling by mounting it on a junction box which is itself secured to the framework of the wall or ceiling. Electrical wires for carrying the electrical power are routed through the walls or ceiling to the junction box where the ends of the wires are exposed for connection to the fixture. The junction box, which is required by standard building codes, opens out onto the wall or ceiling and provides a safe shielded enclosure for the electrical connections inside the box as well as a secure footing for supposing the weight of the fixture once it is mounted.

In a common procedure for installing an electrical fixture on a wall or ceiling a cross bar is attached across the open end of the junction box and supports the fixture. The cross bar is usually a flat metallic strip which is screwed into threaded lugs at the edges of the junction box. Attached to the cross bar is a central length of threaded pipe, which serves as a support post for the fixture, which may be secured to the central pipe with a bracket and nut, for example. In the installed configuration the cross bar supports the full weight of the fixture. In a common alternative procedure, fixtures are sometimes screwed directly to the junction box at the threaded lugs without using a cross bar. In either case, before the fixture can be attached to the cross bar or junction box, it must be electrically connected to the wires routed through the walls to the junction box. The electrical connections are normally made by splicing the wires together using specialized wire connectors designed for this purpose.

The difficulty in installation comes in supposing the fixture while the wires are being connected and while the fixture is being attached to the junction box. The first problem is in splicing the wires together. An installer needs a certain amount of working space to join the wires comfortably. If the fixture is attached loosely to the central support post on the cross bar, i.e., to the post that is intended to support the fixture, the space behind the fixture is generally too cramped for comfortable work. Installers typically want more space to work in. As a result, a typical installer will hold the fixture at the junction box by cradling or resting it on his or her arm while twisting the wires together with wire connectors. For ceiling installations this is done while perched on a ladder. Sometimes instead of cradling the fixture to support it, an installer will merely hold it by the electrical wires with several fingers of one hand while using the remaining fingers and the second hand to make the electrical connections. After the electrical connections are made, the fixture is sometimes left hanging by the newly connected wires while the installer gets the necessary hardware for mechanically attaching the fixture base to the junction box.

This procedure has a number of disadvantages. It is awkward for the installer to balance the fixture during the installation process, particularly while standing on a ladder. As a result it can take longer to install. To the professional installer slower installation means lower earnings. In addition, the awkwardness in installation sometimes causes an installer to drop a fixture with resulting damage to the fixture, which sometimes then has to be returned to the manufacturer. Furthermore, the electrical connections may be damaged when a fixture is left hanging from the wires. For a larger fixture, which may be heavier or more awkward, a second worker must sometimes hold the fixture while a first worker makes the electrical connections and secures the fixture to the cross bar or junction box. This has the obvious disadvantage that it requires two workers to install the fixture. Not only is this inconvenient for the home owner installing a fixture on his or her own, for the professional installer it is simply not cost-effective to use two workers for a task that should require only one.

There is an additional problem when installing devices known as passive infrared (PIR) motion detectors. A PIR motion detector is a device that turns on a light or activates an alarm when a person or other warm object such as an automobile enters the field of view of the device. The device includes a specially arranged array of lenses or mirrors that define the field of view of the device. The array of lenses or mirrors directs infrared energy from a person or object located in the field of view to a sensitive electronic detecting unit that senses the impinging infrared energy and triggers the light or alarm in response. Here there is a greater chance of damage to the device if it is dropped during installation or even if it is hung by the electrical connections in an intermediate stage of installation because PIR motion detectors are more susceptible to damage than an ordinary light fixture. Here the lenses or mirrors and detecting unit can become misaligned, and the electronics of the infrared sensing unit can be damaged. Once the alignment has been disturbed, it is then more difficult, and more time-consuming, to align the field of view of the unit after it is mounted on the wall or ceiling, assuming the unit has not been so damaged that it has become inoperative.

These installation problems, although seemingly minor, are widespread, and installers have come to accept them as an annoying but inevitable aspect of the job.

SUMMARY OF THE INVENTION:

It is an object of the present invention to provide a simple, low-cost method for supporting a fixture while it is being installed that will save time in the installation and that will avoid damage to the electrical connections or damage to the alignment of infrared sensors and lens arrays in passive infrared motion detectors during installation. Briefly, apparatus according to the invention provides a fixture support link that is easily attachable to the junction box and fixture without the need for tools, and can even be attached with only one hand, and that supports the weight of the fixture during installation without interfering with the installation process. When the electrical connections are completed and the fixture is ready to be mounted on the junction box, the support link may simply be left in place in the junction box or in one embodiment may be removed with one hand as easily as it was attached. The support link is secured to the back side of the fixture in a position that will face the junction box when the fixture is in its installed configuration on the junction box. The other end of the support link is formed to be attachable to the junction box, either directly or through additional mounting hardware such as a cross bar across the face of the junction box. The junction box or cross bar is an otherwise conventional junction box or cross bar that has been provided with a means by which the support link may be readily attached at the time of installation with a simple hand motion without any tools. With this apparatus an installer begins installing a fixture first by attaching the support link so that the fixture hangs from the junction box firmly supported by the support link. The installer then has both hands free to make the electrical connections. The support link may then be removed or, since it is flexible and occupies almost no space, may be stuffed into the junction box along with the electrical leads from the fixture as the fixture is mounted on the junction box. Use of the installation apparatus of the present invention is beneficial because it is safer to install the unit, and for ceiling installations it avoids the precarious position of balancing the fixture while making the electrical connections and securing the unit to the ceiling while balancing oneself on a ladder. In addition, it reduces the number of units damaged during installation that are returned to the manufacturer.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a perspective view of a junction box and a portion of an electrical device, showing an embodiment of apparatus according to the invention connecting the junction box and device.

FIG. 2 is a cross-sectional view of the cross bar keyhole slot shown in FIG. 1.

FIG. 3 is a perspective view of an alternative support link arrangement according to the invention.

DETAILED DESCRIPTION OF ILLUSTRATIVE EMBODIMENTS

FIG. 1 shows a conventional junction box 10, to which an electrical cable 11 is routed for connection to an electrical device 12 such as a lighting fixture or passive infrared motion detector. For simplicity of illustration only a single cable 11 is shown in FIG. 1. In practice two or three cables may be routed to any one junction box for controlling switches or for routing electrical power further on to other junction boxes along the same line. For illustration junction box 10 is shown in FIG. 1 in a vertical disposition as it would be mounted in the framework of a side wall. The invention is intended to be used also with ceiling-mounted junction boxes, and may in fact be of even greater utility and convenience when mounting fixtures on ceilings. Although FIG. 1 illustrates electrical device 12 as a box-like structure such as might be used for a PIR motion detector housing, the invention may readily be used with other shapes as well such as found on ceiling or wall-mounted light fixtures.

As explained above, when a motion detector or fixture is installed in customary fashion, a cross bar 13 is often preliminarily attached to junction box 10. Cross bar 13 typically carries a threaded support post 14, and the motion detector or fixture is mounted on support post 14 through the opening 16 in backing plate 12. For the sake of illustration, support post 14 in FIG. 1 is fixed to cross bar 13. Alternatively, in some fixtures the support post is fixed to the fixture base and is mounted on the junction box cross bar through a central opening in the cross bar. The present invention is intended to function with either configuration.

Before mounting the unit on post 14, it is necessary to connect the multiple electrical leads 17 included within electrical cable 11 with the corresponding electrical leads 18 of the unit. The -first electrical connection is typically made while holding the unit 12 in some way. For heavier lighting fixtures a second person is usually needed to hold the unit, while for lighter-weight fixtures the unit is held in one hand, and the tendency is to hold the unit by one of the leads 18 as that lead is joined with a lead 17. The unit is often even left temporarily dangling, supported only by joined electrical leads, sometimes after only a single electrical connection has been made. To prevent this, the present invention provides a flexible link separate from the electrical wires for supporting the unit to be mounted while the electrical connections are being made and while preparations are made for mechanically securing the unit to the junction box. The support link may take various forms such as the thin elongate filament 21 shown in FIG. 1 or the flat web-like strap 22 shown in FIG. 3. For lighter fixtures a thin filament structure 21 will suffice, while for heavier fixtures a strap structure 22 may be necessary. The support link may be formed of an inexpensive flexible plastic material. Those of ordinary skill in the art of plastics fabrication will readily be able to select appropriate materials giving the link sufficient tensile strength to support fixtures in common weight ranges, yet maintaining flexibility of the link. The link may also be formed of wire, such as a length of stranded wire, which is sufficiently flexible to permit the link to be readily connected to the unit and junction box and to be stuffed into the junction box without providing any appreciable interference or resistance as the unit is positioned against the junction box for mounting. In general, a wire link is less preferred because it will generally have less "give" and be more cumbersome to make the supporting connections quickly and/or have greater production cost. In addition, a wire link introduces an extra step: for safety the wire link must be electrically grounded if the link is to be stuffed into the junction box when the fixture is mounted.

The support link is formed with an attachment means at one end for releasably attaching and detaching the link to and from the junction box structure. The link is also provided with a means at the other end for attachment to the fixture, which means may permanently attach the link to the fixture, or alternatively it may permit the link to be releasably attached and detached at the fixture end as at the junction box end. In FIG. 1 the means for attaching the support link to the junction box structure is provided by the combination of a restraining ball 23 at the junction box end of support link 21 and a keyhole slot 24 in cross bar 13 for receiving restraining ball 23. The keyhole slot and restraining ball serve to secure the support link to the cross bar and hold it there under the weight of the dangling fixture as the electrical connections are made.

The fixture end of support link 21 may be provided with a restraining ball 26 which cooperates with a keyhole slot 27 in the backing plate 12 of the fixture or other such member on the back side of the fixture, so that the support link may also be removably attached to the fixture at the time of installation. Alternatively, the support link may be permanently attached to the back of the fixture at the time of manufacture, for example, by heat-staking the link 22 to backing plate 12 or to some other portion of the back side or underside of the fixture as shown in FIG. 3.

It is not necessary, of course, to use a crimped ball and keyhole slot to gain the benefits of the invention. A variety of other securing means and cooperating restraining means and receiving means could be used in place of the restraining balls 23 and 26 and keyhole slots 24 and 27, as those skilled in the art will recognize. For example, a simple vertical (or angulated) slot 28, also shown in FIG. 1, will suffice to receive and hold the restraining ball 23 at cross bar 13 when the associated junction box is mounted in a vertical wall. Other combinations with various styles of tabs or lugs or clips can also be fashioned as is convenient to the particular process used to manufacture the cross bar or junction box, support link and backing member.

When mounting a fixture on a ceiling, junction box 10 will be in horizontal disposition mounted flush against the ceiling framework. Cross bar 13 will then be disposed parallel to the ceiling. A keyhole slot 24 or parallel slot 28 may also be used in this configuration; however, to retain the restraining means 23 of support link 21 at the cross bar in slot 24 or 28, the backside of the cross bar defining the slot is formed with a depression 29 such as shown in the cross-sectional view of FIG. 2 for a keyhole slot. When the junction box is mounted in a ceiling, restraining means 23 rests in depression 29, which prevents link 21 from sliding out of the slot. Other means for retaining the restraining means of the link together with its associated anchor member may also be used. For example, in the alternative embodiment shown in FIG. 3, in which support link 22 is permanently fixed to backing member 12 at the time of manufacture, the securing means at the junction box end of strap 22 is provided by the combination of the hole 31 in strap 22 and the retaining lug 32 on the cross bar. For ceiling mounts, lug 32 is formed with an angulated shape as indicated at reference numeral 33, which serves as a hook to hold link 22 in position when the cross bar is oriented parallel to the ceiling. Although the lug 32 is illustrated in FIG. 3 as projecting from cross bar 13, it may of course alternatively be formed on the junction box itself.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, the keyhole slot or other such means for receiving and securing the support link at the junction box need not be formed in cross bar 13, but could alternatively be formed in the junction box directly or on some other tab or member attached to the junction box. Therefore, the invention is not to be limited to the above description and illustrations, but is defined by the appended claims.

What is claimed is:

1. A method of installing a fixture on an electrical junction box having electrical wires for providing electrical power to the fixture comprising the steps of:

providing a flexible support link;

securing a first end of said support link to the back side of the fixture in a position facing the junction box when the fixture is in its installed orientation;

securing a second end of said support link to the junction box, whereby the fixture hangs from and is supported by said support link;

electrically connecting the fixture to the electrical wires in the junction box while the fixture hangs from said support link; and mounting the fixture on the junction box.

2. The method of claim 1 further comprising the steps of:

mounting a cross bar across the junction box; and securing said second end of said support link to said cross bar.

3. The method of claim 1, further comprising the step of stuffing said support link into the junction box when the fixture is being mounted on the junction box after the fixture is electrically connected to the electrical wires in the junction box.

4. The method of claim 1, further comprising the step of removing said support link from the fixture and from the junction box when the fixture is being mounted on the junction box after the fixture is electrically connected to the electrical wires in the junction box.

* * * * *